US008495025B2

(12) United States Patent
Newson et al.

(10) Patent No.: US 8,495,025 B2
(45) Date of Patent: Jul. 23, 2013

(54) FOLDERING BY STABLE QUERY (75) Inventors: Robert S. Newson, Windsor (GB);
Arnaud Lucas, Cambridge, MA (US);
Thomas R. Weissinger, Hopkinton, MA (US); Dylan Bui, Shrewsbury, MA (US)

(73) Assignee: Autonomy, Inc., San Francisco, CA (US)

( * ) Notice: Subject to any disclaimer, the term of this patent is extended or adjusted under 35 U.S.C. 154(b) by 180 days.

(21) Appl. No.: 12/789,797

(22) Filed: May 28, 2010

(65) Prior Publication Data

US 2011/0202506 A1 Aug. 18, 2011

Related U.S. Application Data (60) Provisional application No. 61/305,680, filed on Feb. 18, 2010.

(51) Int. Cl.
*G06F 7/00* (2006.01)
*G06F 17/30* (2006.01)

(52) U.S. Cl.
CPC .... *G06F 17/30067* (2013.01); *G06F 17/30286* (2013.01)
USPC ...................................................... 707/661

(58) Field of Classification Search
CPC ...................... G06F 17/30067; G06F 17/30286
USPC ...................................................... 707/661
See application file for complete search history.

(56) References Cited

U.S. PATENT DOCUMENTS

| | | | |
|---|---|---|---|
| 6,061,695 A * | 5/2000 | Slivka et al. | 715/203 |
| 6,484,162 B1 | 11/2002 | Edlund et al. | |
| 6,810,404 B1 | 10/2004 | Ferguson et al. | |
| 6,820,094 B1 | 11/2004 | Ferguson et al. | |
| 7,054,860 B2 | 5/2006 | Inaba et al. | |
| 7,386,529 B2 | 6/2008 | Kiessig et al. | |
| 7,386,530 B2 | 6/2008 | Kiessig et al. | |
| 7,386,531 B2 | 6/2008 | Kiessig et al. | |

(Continued)

FOREIGN PATENT DOCUMENTS

| EP | 1672534 A1 | 6/2006 |
|---|---|---|
| WO | WO-2006121453 A1 | 11/2006 |

OTHER PUBLICATIONS

"Mac OS X 10.4 Help," Mac OS X 104.4 Help: Organizing Related Files with Smart Folders, taken from http://docs.info.apple.com/article.html?path=Mac/10.4/en/mh2152.html, viewed Aug. 20, 2010, 1 page.

(Continued)

*Primary Examiner* — Cheyne Ly (57) ABSTRACT

Instead of adding resources into a folder by specifying a list of identifiers, client applications add resources to a folder by specifying a search query that matches the resources to be added. The virtual folder is, therefore, a collection of search queries rather than a collection of resource identifiers. This allows the data archive systems to easily store folder information in a database. A client application can then search by specifying the folder as its search criteria to list all content associated with the folder. Additionally, to ensure that the list of results associated with a particular query does not change after the query is added into a folder, the data archive system also captures generation information associated with the particular query (i.e., the iteration of the search indexes at the time the query is received) and stores the generation information with the query as part of the folder.

15 Claims, 7 Drawing Sheets

U.S. PATENT DOCUMENTS

| | | |
|---|---|---|
| 7,386,532 B2 | 6/2008 | Kiessig et al. |
| 7,606,789 B2 | 10/2009 | Venditti et al. |
| 2005/0021540 A1* | 1/2005 | McKee et al. .................. 707/100 |
| 2005/0027757 A1 | 2/2005 | Kiessig et al. |
| 2005/0080807 A1* | 4/2005 | Beilinson et al. ............. 707/102 |
| 2006/0015482 A1 | 1/2006 | Beyer et al. |
| 2006/0112081 A1* | 5/2006 | Qureshi ............................ 707/3 |
| 2007/0143333 A1 | 6/2007 | Laird-McConnell |
| 2007/0250485 A1* | 10/2007 | Ushiku ............................ 707/3 |

OTHER PUBLICATIONS

EPO—European Search Report EP Application No. 11155090.1 dated Jan. 24, 2012; 8 pages.

* cited by examiner

FOLDERING BY STABLE QUERY

CROSS REFERENCE TO RELATED APPLICATIONS

This Patent Application claims priority to U.S. Patent Application No. 61/305,680 filed on Feb. 18, 2010, entitled, "FOLDERING BY STABLE QUERY," the contents and teachings of which are hereby incorporated by reference in their entirety.

BACKGROUND

Certain conventional data archive systems utilize virtual folders to group assets (i.e., metadata and content such as electronic documents, electronic images, etc.) stored as part of the system. For example, once a user has stored one or more assets as part of the data archive system, the user can add any of the stored assets to a virtual folder. By allowing users to associate particular assets with one or more virtual folders, conventional data archive systems provide the user with the ability to logically organize assets in a manner that makes sense to the user. Additionally, with such a configuration, conventional data archive systems allow the user to perform actions on related assets associated with a particular virtual folder, such as searching and retrieving associated assets.

SUMMARY

In conventional data archive systems, content addressable storage is flat (i.e., the assets are not arranged in a hierarchical fashion). Accordingly, in order to track the assets associated with a particular virtual folder, conventional data archive systems store collections of identifiers associated with the virtual folder in a table where each one of the identifiers uniquely identifies an asset or resource. However, with respect to the use of virtual folders, in the case where a relatively large number of assets are associated with a single virtual folder (e.g., where there can be millions of resources inside a single folder), the folders must store large numbers of identifiers. Accordingly for large numbers of assets, the flat content addressable storage structure does not scale well and can become expensive to operate.

Embodiments of the invention relate to the association of stable queries with a virtual folder in a distributed, server-side environment. For example, instead of adding resources into a folder by specifying a list of identifiers, client applications add resources to a virtual folder by specifying a search query that matches the resources to be added. This allows the data archive systems to easily store folder information in a database. Additionally, to ensure that the list of results associated with a particular query does not change after the query is added into the virtual folder, the data archive system captures a generation identifier associated with the particular query (i.e., the iteration of the search indexes at the time the query is received) and stores the generation identifier with the query as part of the virtual folder. The virtual folder is, therefore, a collection of search queries and generation identifiers for each of the queries, rather than a collection of resource identifiers. During a search procedure, for any searches run with the particular query, the data archive system provides matching results only for a specific generation associated with the query of the indexes. Accordingly, a query issued today can be reissued at a later time and still match the same resources.

In one arrangement, in a computerized device of a data archive system, a method of foldering a query includes receiving, by the computerized device, a query from a user device, the query relating to a set of assets stored by the data archive system, retrieving, by the computerized device, a generation identifier associated with a state of the set of assets of the data archive system at the time the query is received, and storing, by the computerized device, the query associated with the set of assets stored by the data archive system and the generation identifier associated with the state of the set of assets in a virtual folder.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the invention relate to the association of stable queries with a virtual folder in a distributed, server-side environment. For example, instead of adding resources into a folder by specifying a list of identifiers, client applications add resources to a virtual folder by specifying a search query that matches the resources to be added. This allows the data archive systems to easily store folder information in a database. Additionally, to ensure that the list of results associated with a particular query does not change after the query is added into the virtual folder, the data archive system captures a generation identifier associated with the particular query (i.e., the iteration of the search indexes at the time the query is received) and stores the generation identifier with the query as part of the virtual folder. The virtual folder is, therefore, a collection of search queries and generation identifiers for each of the queries, rather than a collection of resource identifiers. During a search procedure, for any searches run with the particular query, the data archive system provides matching results only for a specific generation associated with the query. of the indexes. Accordingly, a query issued today can be reissued at a later time and still match the same resources.

Figure 1:
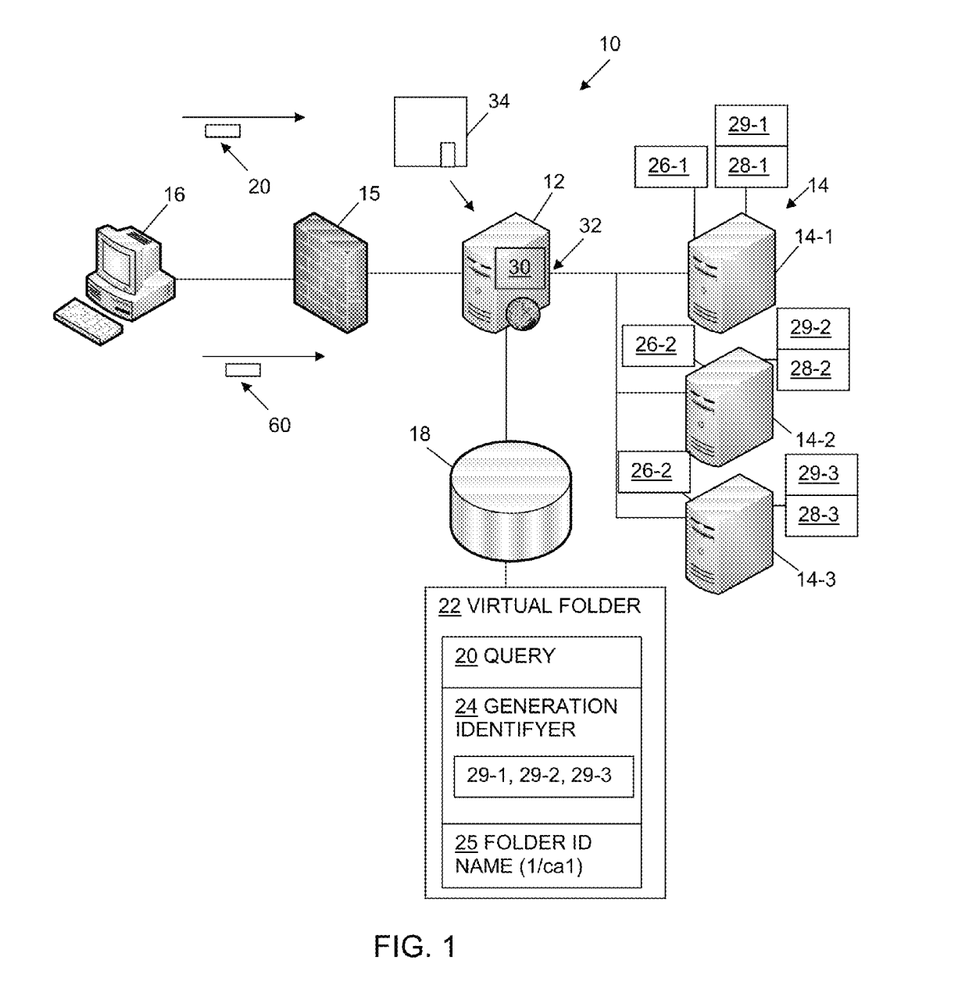
FIG. 1 illustrates a schematic representation of a data archive system, according to one embodiment.

FIG. 1 illustrates an example of a data archive system 10 that includes a computerized device, herein referenced as front end server device 12, and one or more back end server devices or search nodes 14 configured as part of an intra-net, such as an internal network. In one arrangement, the front end server device 12 forms an Archive Services Layer (ASL) and is configured to provide foldering services to a user or client device 16, such as a computerized device, disposed in electrical communication with the data archive system 10 via a network connection. As will be described below, the front end server device 12 is configured to create virtual folders within a database 18 on behalf of the client device 16. It should be noted that assets associated with a virtual folder are not related to a particular physical location in the data archive system 10. Rather the assets associated with a virtual folder can reside in the data archive system 10 in a variety of physical locations but are aggregated into the virtual folder based upon one or more aggregation criteria.

Figure 2:
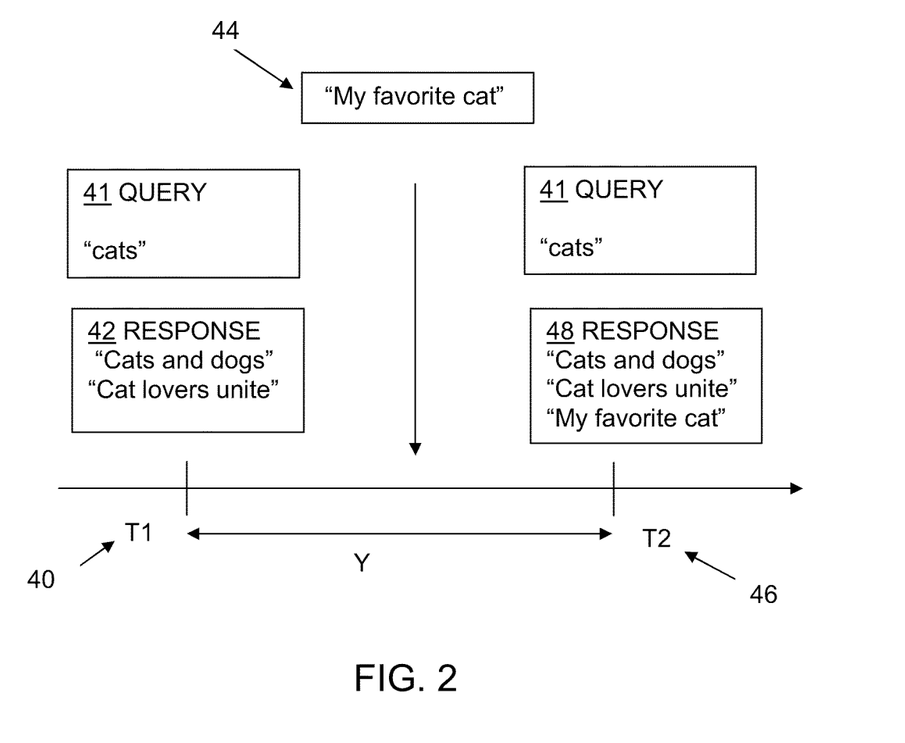
FIG. 2 illustrates changing assets of the data archive system as a client device provides additional assets to a data archive system for storage.

Over time, in conventional data archive systems, the assets stored by the data archive system will change as a client device provides additional assets to the data archive system for storage. For example, with reference to FIG. 2, assume at a first time 40, the client device issues a query 41 to the data archive system for assets having "cats" included in the title. In response to the query 41, assume the data archive system 10 provides a response 42 to the query 41 where the response 42 includes N matches: "Cats and Dogs" and "Cat Lovers Unite." Further assume that over time Y, the client device stores additional assets on the data archive system having "cats" included in the title, such as the added asset 44 entitled "My Favorite Cat." In the case where, at a second time 46 (e.g., the first time 40+Y), the client device issues a query 41 for assets having "cats" included in the title, because the number of assets having "cats" included in the title has changed, the data archive system provides a response 48 that includes N+X matches: "Cats and Dogs," "Cat Lovers Unite," and "My Favorite Cat" where X is the number of assets having "cats" included in the title stored on the data archive system over time Y. Accordingly, due to the dynamic nature of conventional data archive systems, the results for the same queries issued by a client device will change over time.

Returning to FIG. 1, by contrast to conventional data archive systems, the data archive system 10 is configured to track assets stored by all back end devices 14 at particular points in time and associate a generation value with the assets at that time. For example, the client device 16 is configured to search for assets stored as part of the data archive system 10 by transmitting asset requests or queries 20 to the data archive system 10. In response, the front end server devices 12 create a virtual folder 22 that includes the query 20 and a generation identifier 24 associated with the global state of the data archive system 10 as part of the virtual folder 22.

For example, the front end server device 12 is configured to store queries 20 received from the client device 16 and a generation identifier 24, such as a generation number, associated with the particular query 20 within a particular virtual folder 22. Accordingly, the front end server device 12 defines a virtual folder 22 as a saved query (or queries) 20 and an associated generation identifier 24. As indicated above, the query 20 relates to a set of assets stored by the data archive system 10. By storing queries rather than query results, the front end server device 12 saves storage space associated with the data archive system 10. Additionally, the generation identifier 24 provides an indication of a state or snapshot of the set of assets of the data archive system 10 at the time the front end server device 12 receives the query 20. By capturing and storing a generation identifier 24 associated with the particular query 20, the front end server device 12 allows the query 20 to be reissued by the client device 16 at a later time and match the resources associated with the earlier-issued query 20 (i.e., the list of results associated with a particular query does not change after the query is added into a folder). Accordingly, by using query-based foldering in association with the generation identifier 24, the data archive system 10 provides a level of stability to queries received from a user device (i.e., to allow a query issued today to be reissued at a later time and still match the same assets).

While the front end server device 12 can obtain the generation identifier 24 in a variety of ways, in one arrangement, the front end server device 12 operates in conjunction with the back end server devices 14 to obtain the generation identifier 24.

The back end server devices 14, such as devices 14-1, 14-2, and 14-3, are disposed in electrical communication with the front end server device 12, such as by a set of network connections. Each of the back end server devices 14 is configured to store assets 26 (i.e., metadata and content such as electronic documents, electronic images, etc.), as well as search indexes 28 such as Apache Lucene search indexes, associated with the archived assets 26. It should be noted that the back end server device 14 maintains search index 28 separately from the stored assets 26. For each back end device 14, each search index has a corresponding generation number associated therewith.

As a back end server device 14 receives resources or assets, the back end server device 14 can update its corresponding search indexes to update generation information 29 associated with each index. Taking back end server device 14-1 as an example, when the back end server device 14-1 receives or ingests an asset, the back end server device 14-1 extracts meaningful text or tokens, such as keywords, from the asset. The back end server device 14-1 can then update or roll its corresponding search index 28-1 with the extracted text from the ingested asset. In response to updating the search index 28-1, the back end server device 14-1 increments the associated generation information 29-1 (e.g., the generation values for an index form a strictly increasing progression) to provide an indication of the state or time affiliation of the index 28-1. The set of these values is the generation string, effectively a global snapshot of the index state. As will be described below, the front end server device 12 utilizes the generation information 29 from each of the back end server devices 14 to create the generation identifier 24 for storing with a query 20 as part of a virtual folder 22.

Figure 3:
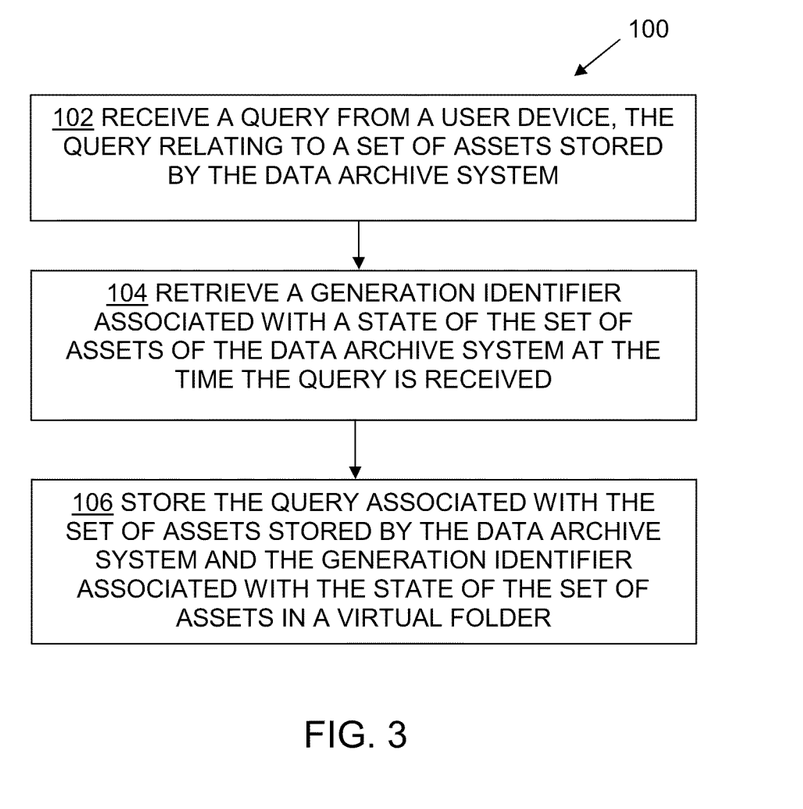
FIG. 3 is a flowchart that illustrates a procedure performed by a front end server device as shown in FIG. 1.

FIG. 3 is a flowchart 100 that illustrates a procedure performed by the front end server device 12 when foldering a query 20.

In step 102, the front end server device 12 receives a query 20 from a user device 16, the query 20 relating to a set of assets 26 stored by the data archive system 10. For example, with reference to FIG. 1, the client device 16 transmits a query 20 to the front end server devices 12. In one arrangement, the client device 16 transmits the query 20 through a firewall or load balancer 15 to the front end server device 12 which is exposed as a web service. The front end server device 12, in response to receiving the query 20, creates a virtual folder 22 as part of the database 18, assigns the virtual folder 22 a folder identification 25, such as 1/ca1, and stores the query 20 as part of the virtual folder 22.

Returning to FIG. 3, in step 104, the front end server device 12 retrieves a generation identifier 24 associated with a state of the set of assets 26 of the data archive system 10 at the time the query 20 is received. For example, with reference to FIG. 1, when the client device 16 transmits the query 20 to the front end server device 12, in response to receiving the query 20, the front end server device 12 retrieves the generation information 29-1, 29-2, and 29-3 associated with each of the back end server devices 14-1, 14-2, 14-3, respectively, and combines the generation information 29-1 through 29-3 to form the generation information 29. For example, the back end server device 14 concatenates each generation value into a single string which represents the global state or global snapshot of the assets stored by the data archive system 10 at the time the front end server device 12 receives the query 20. The string is lightly delta compressed for space efficiency.

Returning to FIG. 3, in step 106, the front end server device 12 stores the query 20 associated with the set of assets 26 stored by the data archive system 10 and the generation identifier 24 associated with the state of the set of assets in a virtual folder 22. In one arrangement, with reference to FIG. 1, by associating the generation identifier 24 with the received query 20, the front end server devices 12 can, at a future time, retrieve assets associated with the state of the data archive system 10 at the time the query 20 was received, regardless of changes in the state of the assets stored by the data archive system 10.

Figure 4:
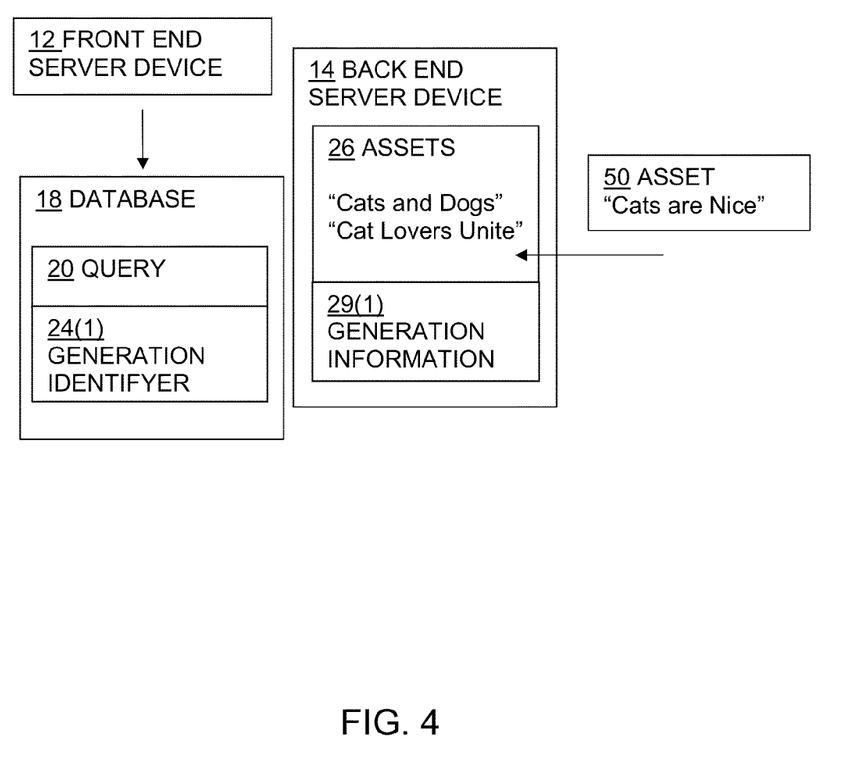
FIG. 4 illustrates a procedure performed by a front end server device as shown in FIG. 1 when associating a generation identifier with a particular query.

For example, with reference to FIG. 4 assume that at a first time, as associated with a first generation information value 29(1), the back end server devices 14 store assets titled "Cats and Dogs" and "Cat Lovers Unite." Further assume that in response to a query 20 from the client device 16 for assets having "cats" included in the title, the front end server device 12 stores the query 20 and a generation identifier 24 based upon the first generation information value 29(1). Also, assume that over time, the client device 16 stores additional assets on the data archive system 10, such as the added asset 50 entitled "Cats are Nice," causing the back end server devices 14 to increment the generation information value to a second generation information value 29(2).

In the case where, at a second time (i.e., at a time following the first time), the client device 16 issues the query 20 for assets having "cats" included in the title, as well as the generation identifier 24, to the front end server device 12. While the assets of the back end server devices 14 have changed over time, because the front end server device 12 has associated the query 20 with the generation identification 29(1), the front end server device 12 retrieves the assets titled "Cats and Dogs" and "Cat Lovers Unite" from the back end server devices 14 and will exclude the added asset 50 entitled "Cats are Nice." Accordingly, by capturing or producing a generation identifier 24 and associating the generation identifier 24 with a particular query 20, the front end server devices 12 ensure that the query 20 is associated with a specific, set point in time relative to the state of the data archive system 10 and ensures that the list of assets associated with a particular query 20 does not change after the query 20 is added into a folder 22.

Once the front end server device 12 has created a virtual folder 22, the data archive system 10 allows the front end server device 12 to modify either the content of the virtual folder 22 or the virtual folder 22 itself in response to commands received from the client device 16.

In one arrangement, the front end server device 12 modifies or changes the foldered query 20 based upon input from the client device 16. For example, with reference to FIG. 1, the front end server device 12 can receive an asset modification command 60 from the client device 16 and modify the query 20 stored in the virtual folder 22 with the folder modification command 60.

Figure 5:
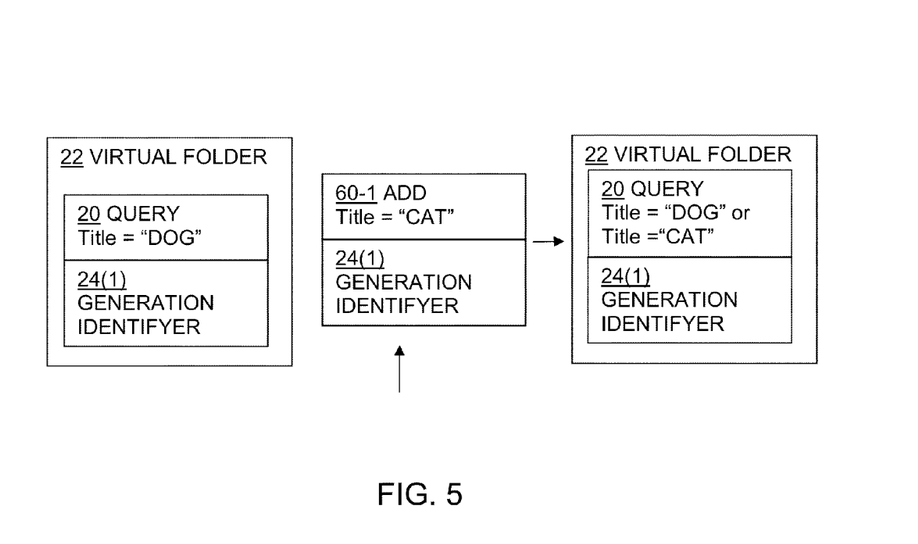
FIG. 5 illustrates an addition to a query of the data archive system of FIG. 1.

In one arrangement, with reference to FIG. 5, the folder modification command 60 can be configured as an folder addition command 60-1 to add to the query 20 stored by the virtual folder 22. For example, assume the virtual folder 22 stores a query 20 which relates to all assets associated with the data archive system 10 at generation identifier 24(1) having the word "dog" in the title. When the front end server device 12 receives the folder addition command 60-1, as well as generation identifier 24(1) to add all assets associated with the data archive system 10 at generation identifier 24(1) having the word "cat" in the title, the front end server device 12 inserts the addition into the folder 22. With such an addition, the query 20 relates to all assets associated with the data archive system 10 at generation identifier 24(1) having the word "dog" or "cat" in the title. In use, when the front end server device 12 executes the modified query 20, the front end server device 12 can then retrieve assets 26 having the word "dog" or "cat" in the title as associated with generation identifier 24(1).

Figure 6:
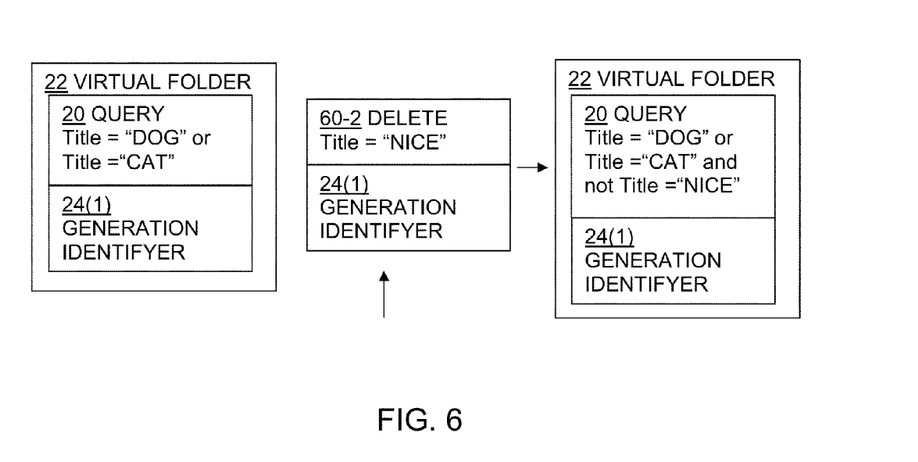
FIG. 6 illustrates a deletion from a query of the data archive system of FIG. 1.

In one arrangement, with reference to FIG. 6, the folder modification command 60 can be configured as a folder removal command 60-2 to add to the query 20 stored by the virtual folder 22. For example, assume the virtual folder 22 stores a query 20 which relates to all assets associated with the data archive system 10 at generation identifier 24(1) having the word "dog" and the word "cat" in the title. When the front end server device 12 receives the folder removal command 60-2, as well as generation identifier 24(1) to remove all assets associated with the data archive system 10 at generation identifier 24(1) having the word "nice" in the title, the front end server device 12 inserts the removal into the folder 22. With such an addition, the query 20 relates to all assets associated with the data archive system 10 at generation identifier 24(1) having the word "dog" or "cat" and not the word "nice" in the title. In use, when the front end server device 12 executes the modified query 20, the front end server device 12 can then retrieve assets 26 that include the word "dog" or "cat" and can exclude assets 26 that include the word "nice" in the title, as associated with generation identifier 24(1).

In one arrangement, with reference to FIG. 1, the folder modification command 60 can be configured to allow the client device 16 the ability to delete virtual folders 20 from the database 18. For example, the front end server device 12 can receive, as the folded modification command 60, a delete folder command from the client device 16. Based upon an identification of the virtual folder 22 included with the delete folder command, the front end server device 12 removes the identified virtual folder 22 from the database 18, such as by disassociating one or more aggregation criteria from the query 20 and generation identifier 24.

Figure 7:
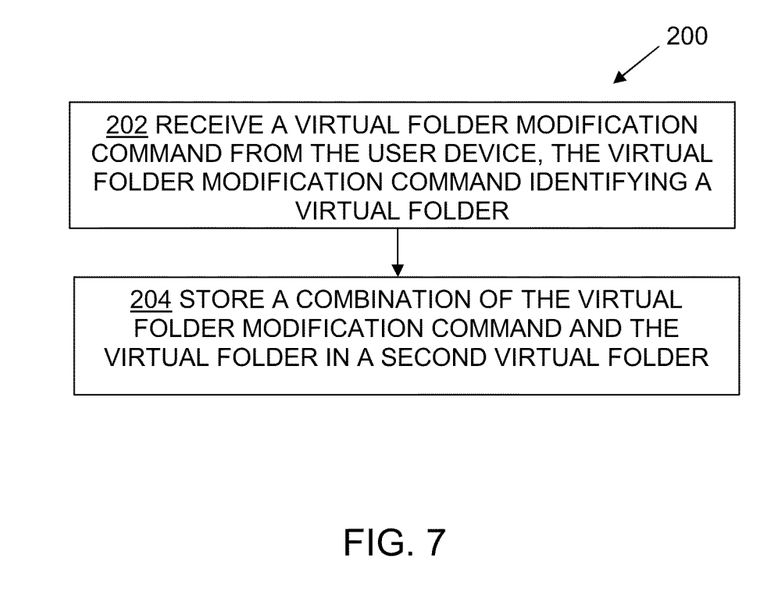
FIG. 7 is a flowchart that illustrates a procedure performed by the front end server device of FIG. 1 when combining a virtual folder with a query.

In one arrangement, the front end server device 12 combines a virtual folder 22 with a query 20 received from the client device 16. FIG. 7 is a flowchart 200 that illustrates a procedure performed by the front end server device 12 when combining a virtual folder 22 with a query 20.

In step 202, the front end server device 12 receives a virtual folder modification command from the user device 16, the virtual folder modification command identifying a virtual folder 22. For example, with reference to FIG. 1, assume the front end server device 12 has created the virtual folder 22 having the folder identification 25 "1/ca1." The virtual folder modification command identifies the virtual folder 22 via the folder identification 25 "1/ca1" and indicates a modification of the asset results related to the virtual folder 22, such as "documents with less than 400 pages."

Returning to FIG. 7, in step 204, the front end server device 12 stores a combination of the virtual folder modification command and the virtual folder 22 in a second virtual folder. For example, with reference to FIG. 1, the front end server device 12 establishes a second virtual folder having a folder identification 25 distinct from the folder identification of the virtual folder 22, such as the folder identification 25 "1/ca2." The front end server device 12 includes as part of the second virtual folder the folder identification 25 of the virtual folder 22, "1/ca1," as well as the modifier, such as "pages <400" and a generation identifier 24. With such a configuration, the data archive system 10 allows virtual folders to refer to other virtual folders.

Figure 8:
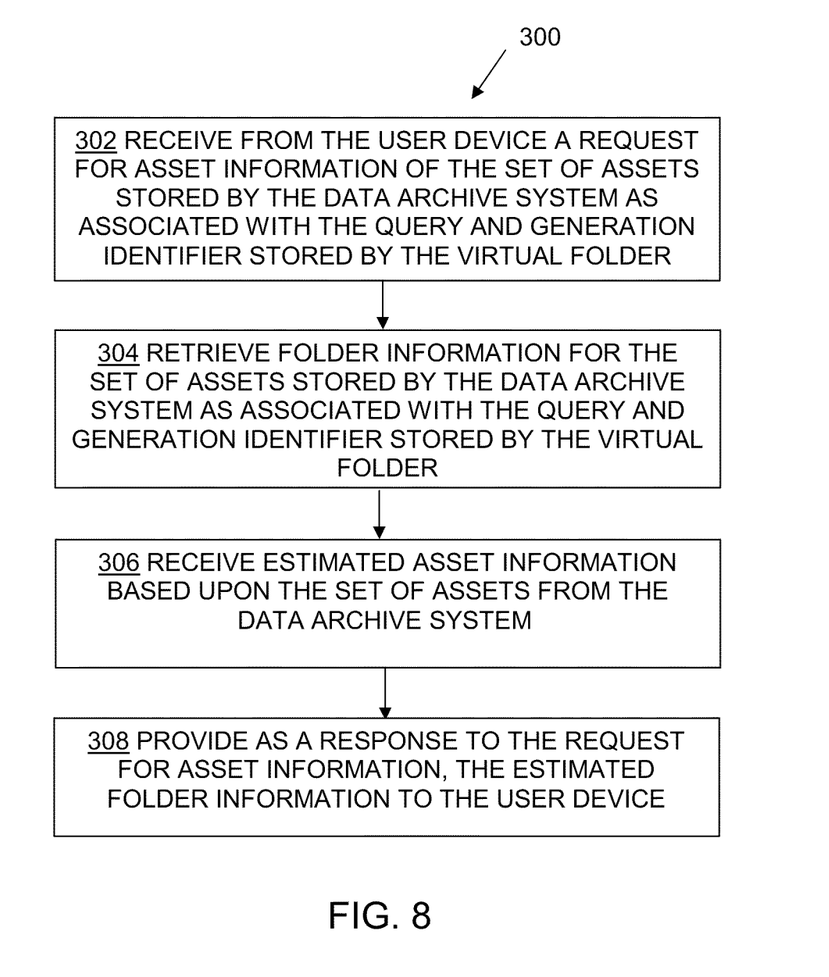
FIG. 8 is a flowchart that illustrates a procedure performed by the front end server device of FIG. 1 when retrieving folder information from the database8.

In one arrangement, the data archive system 10 is also configured to allow the client device 16 the ability to retrieve folder information from the database 18, such as the number of resources associated with a particular query 20 or a storage size of the resources associated with a particular query 20. FIG. 8 is a flowchart 300 that illustrates a procedure performed by the front end server device 12 when retrieving folder information from the database 18.

In step 302, the front end server device 12 receives from the user device 16, a request for asset information of the set of assets 26 stored by the data archive system 10 as associated with the query 20 and generation identifier 24 stored by the virtual folder 22. For example, the client device 16 can provide the front end server device 12 with a request for the total amount of storage space utilized by the assets associated with a particular query 20 of a particular virtual folder 22.

In step 304, the front end server device 12 retrieves folder information (e.g., a number of assets and number of bytes of assets in the folder) for the set of assets stored by the data archive system 10 as associated with the query 20 and generation identifier 24 stored by the virtual folder 22.

In step 306, the front end server device 12 receives estimated asset information based upon the set of assets from the data archive system 10. For example, based upon the number of assets in the virtual folder, the back end server device 14 will extrapolate the storage size of the assets associated with a particular query 20 and generation identifier 24 in order to minimize the amount of time required to ascertain the folder information and provide the extrapolated storage size to the front end server device 12.

In step 308, the front end server device 12 provides as a response to the request for asset information, the estimated folder information to the user device. For example, the front end server device 12 provides the results of the extrapolation to the client device 16 as the asset information (e.g., as the number of assets associated with a particular query 20 and generation identifier 24 or the storage size of the assets associated with a particular query 20 and generation identifier 24).

It should be noted that the configuration of the data archive system 10 allows for folder-based querying in that created folders can be used in subsequent queries. For example, the front end server device 12 can combine a folder A that contains the query "cats" with a folder B that includes the query "dogs."

In certain cases, as part of the data archive system 10, one folder stored by the database 18 can refer to one or more other folders stored by the database. With such cross-referencing, circular dependencies can be created among the folders. For example, assume the case where the front end server device 12 creates a folder A that includes a query "cats." Further assume that the front end server device 12 creates a folder B that includes the query "folderId:folderA" (i.e., folder B includes the entire content of folder A). With such a query, because folder B contains folder A, folder B therefore contains "cats." However, assume the front end server device 12 adds to folder A the query "folderId:folderB" (i.e., take everything from folder B and include in folder A). If the last two queries were only linked to the specified folder, such a query creates a circular dependency between folder A and folder B (i.e., folder A contains "cats" and folder B and therefore contains folder A, and therefore contains "cats" and folder B, and therefore contains folder A, and therefore contains "cats" and folder B . . . ).

In one arrangement, to address potential circular dependencies when copying the contents of one folder into another, the data archive system 10 is configured to utilize sub query references by substituting tokens for folders. For example, assume the case where the front end device 12 creates a folder A that includes a query "cats." When the front end device 12 creates a folder B that references folder A, the front end server device 12 substitutes a token for folder A such that folder B contains "folderId:token1" and "cats" with sub query reference token1. When the front end server device 12 then adds to folder A to reference folder B the front end device 12 substitutes a token for folder B, such that folder A contains "cats", "folderId:token2", "folderId:token1" with sub query reference token2, and "cats" with sub query reference token1. With such a use of token, there is no circular dependency between the folders and folder B is not impacted by a change in folder A.

In one arrangement, to build the actual query to search folder A, the data archive system 10 will first look up any queries of folder A with no sub query reference attached to them, such as "cats" OR "folderId:token2." The system 10 then looks-up the queries with sub query reference token2, such as "cats" OR "folderId:token1." The data archive system 10 then looks-up the queries with sub query reference token1, so the final query recites "cats" OR "cats."

While various embodiments of the invention have been particularly shown and described, it will be understood by those skilled in the art that various changes in form and details may be made therein without departing from the spirit and scope of the invention as defined by the appended claims.

As indicated above, the data archive system 10 updates the generation information 29 when assets are added to the data archive system 10 (i.e., updated and committed to disk). Such indication is by way of example only. In one arrangement, the data archive system 10 automatically updates generation information 29 after the expiration of a preset time interval, such as a time interval of thirty minutes.

As indicated above, the front end server device 12 is configured to store queries 20 received from the client device 16 and a generation identifier 24, such as a generation number, associated with the particular query 20 within a particular virtual folder 22. It should be noted that generation identifier 24 is not required when creating a virtual folder. If not provided, a current generation information value 29 is used from a search index associated with a particular back end server device 14.

As indicated above, the front end server device 12, in response to receiving the query 20 stores the query 20 as part of a virtual folder 22, retrieves the generation information 29 associated with the back end server devices 14, and associates the generation information 29, as a generation identifier 24, with the query 20 as part of the virtual folder 22. Such description is by way of example only. In one arrangement, rather than the front end server devices 12 retrieving the generation information 29 associated with the back end server devices 14, the end user at the client device 16 can specify the generation identifier 24 to the front end server device 12.

While the front end server device 12 can be configured in a variety of ways, in one arrangement, as illustrated in FIG. 1, the front end server device 12 includes a controller 30, such as a memory and a processor, disposed in electrical communication with a communications interface 32. In one arrangement, the controller 30 stores a stable query foldering application. The stable query foldering application installs on the front end server device 12 from a computer program product 34. In some arrangements, the computer program product 34 is available in a standard off-the-shelf form such as a shrink wrap package (e.g., CD-ROMs, diskettes, tapes, etc.). When performed on the controller 30 of the front end server device 12, the stable query foldering application causes the front end server device 12 to store a query 20 and an associated generation identifier as part of a virtual folder 22.

What is claimed is:

1. In a computerized device of a data archive system, a method of foldering a query, comprising:
   receiving, by the computerized device, a query from a user device, the query relating to a set of assets stored by the data archive system;
   retrieving, by the computerized device, a generation identifier that identifies a state of the set of assets of the data archive system at the time the query is received by,
      retrieving generation information associated with an iteration of an index associated with each search node of a set of search nodes of the data archive system; and
      combining the generation information of each search node to generate the generation identifier that identifies the state of the set of assets of the data archive system; and
   storing, by the computerized device, the query associated with the set of assets stored by the data archive system and the generation identifier that identifies the state of the set of assets in a virtual folder.

2. The method of claim 1, comprising: receiving, by the computerized device, a folder modification command from the user device; and modifying, by the computerized device, the query stored in the virtual folder with the folder modification command.

3. The method of claim 2, wherein:
   receiving the folder modification command from the user device comprises receiving, by the computerized device, a folder addition command and the generation identifier associated with the query stored by the virtual folder; and
   modifying the query stored in the virtual folder with the folder modification command comprises combining, by the computerized device, the folder addition command with the query stored by the virtual folder, as identified by the received generation identifier.

4. The method of claim 2, wherein:
   receiving the folder modification command from the user device comprises receiving, by the computerized device, a folder removal command and the generation identifier associated with the virtual folder; and
   modifying the query stored in the virtual folder with the folder modification command comprises combining, by the computerized device, the folder removal command with the query stored by the virtual folder, as identified by the received generation identifier.

5. The method of claim 1, comprising:
   receiving, by the computerized device, a virtual folder modification command from the user device, the virtual folder modification command identifying a virtual folder; and
   storing, by the computerized device, a combination of the virtual folder modification command and the virtual folder in a second virtual folder.

6. The method of claim 1, comprising:
   receiving, by the computerized device, a delete folder command from the user device, the delete folder command identifying a virtual folder; and
   deleting, by the computerized device, the virtual folder identified by the delete folder command.

7. The method of claim 1, comprising:
   receiving, by the computerized device and from the user device, a request for asset information of the set of assets stored by the data archive system as associated with the query and generation identifier stored by the virtual folder;
   retrieving, by the computerized device, folder information for the set of assets stored by the data archive system as associated with the query and generation identifier stored by the virtual folder;
   receiving, by the computerized device, estimated asset information based upon the set of assets from the data archive system; and
   providing, by the computerized device, as a response to the request for asset information, the estimated folder information to the user device.

8. A computerized device of a data archive system, comprising:
   at least one communications interface; and a controller electrically coupled to the at least one communications interface wherein the controller is to:
   receive a query from a user device, the query relating to a set of assets stored by the data archive system;
   retrieve a generation identifier that identifies a state of the set of assets of the data archive system at the time the query is received through,
      retrieval of generation information associated with an iteration of an index associated with each search node of a set of search nodes of the data archive system; and
      combination of the generation information of each search node to generate the generation identifier that identifies the state of the set of assets of the data archive system; and
   store the query associated with the set of assets stored by the data archive system and the generation identifier that identifies the state of the set of assets in a virtual folder.

9. The computerized device of claim 8, wherein the controller is to:
   receive a folder modification command from the user device; and
   modify the query stored in the virtual folder with the folder modification command.

10. The computerized device of claim 9, wherein:
   when receiving the folder modification command from the user device, the controller is to receive a folder addition command and the generation identifier associated with the query stored by the virtual folder; and
   when modifying the query stored in the virtual folder with the folder modification command, the controller is to combine the folder addition command with the query stored by the virtual folder, as identified by the received generation identifier.

11. The computerized device of claim 9, wherein:
   when receiving the folder modification command from the user device, the controller is to receive a folder removal command and the generation identifier associated with the virtual folder; and
   when modifying the query stored in the virtual folder with the folder modification command, the controller is to combine the folder removal command with the query stored by the virtual folder, as identified by the received generation identifier.

12. The computerized device of claim 8, wherein the controller is to:
receive a virtual folder modification command from the user device, the virtual folder modification command identifying a virtual folder; and
store a combination of the virtual folder modification command and the virtual folder in a second virtual folder.

13. The computerized device of claim 8, wherein the controller is to:
receive a delete folder command from the user device, the delete folder command identifying a virtual folder; and
delete the virtual folder identified by the delete folder command.

14. The computerized device of claim 8, wherein the controller is to:
receive from the user device, a request for asset information of the set of assets stored by the data archive system as associated with the query and generation identifier stored by the virtual folder;
retrieve folder information for the set of assets stored by the data archive system as associated with the query and generation identifier stored by the virtual folder;
receive estimated asset information based upon the set of assets from the data archive system; and
provide as a response to the request for asset information, the estimated folder information to the user device.

15. A computer program product having a non-transitory computer-readable medium including computer program logic encoded thereon that, when performed on a controller of a computerized device causes the computerized device to:
receive a query from a user device, the query relating to a set of assets stored by the data archive system;
retrieve a generation identifier that identifies a state of the set of assets of the data archive system at the time the query is received through,
retrieval of generation information associated with an iteration of an index associated with each search node of a set of search nodes of the data archive system; and
combination of the generation information of each search node to generate the generation identifier that identifies the state of the set of assets of the data archive system; and
store the query associated with the set of assets stored by the data archive system and the generation identifier that identifies the state of the set of assets in a virtual folder.

* * * * *